(12) United States Patent
Baheti et al.

(10) Patent No.: US 9,076,242 B2
(45) Date of Patent: Jul. 7, 2015

(54) AUTOMATIC CORRECTION OF SKEW IN NATURAL IMAGES AND VIDEO

(71) Applicant: QUALCOMM Incorporated, San Diego, CA (US)

(72) Inventors: Pawan Kumar Baheti, Bangalore (IN); Kishor K. Barman, Bangalore (IN); Hemanth P. Acharya, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 13/831,237

(22) Filed: Mar. 14, 2013

(65) Prior Publication Data

US 2014/0022406 A1 Jan. 23, 2014

Related U.S. Application Data

(60) Provisional application No. 61/673,703, filed on Jul. 19, 2012.

(51) Int. Cl.
*H04N 5/232* (2006.01)
*G06K 9/36* (2006.01)
(Continued)

(52) U.S. Cl.
CPC ............ *G06T 3/608* (2013.01); *H04N 5/23222* (2013.01); *G06K 9/325* (2013.01); *G06K 9/3283* (2013.01)

(58) Field of Classification Search
CPC .... H04N 5/23222; G06T 3/608; G06T 11/60; G06K 9/3283; G06K 9/325; G06K 9/00456; G06K 9/3258; G06K 9/36; G06K 9/00469; G06K 2009/363
USPC ................ 348/222.1; 382/171–180, 289, 229
See application file for complete search history.

(56) References Cited

U.S. PATENT DOCUMENTS 3,710,321 A   1/1973   Rubenstein
4,654,875 A   3/1987   Srihari et al.
(Continued)

FOREIGN PATENT DOCUMENTS

EP   1146478 A2   10/2001
EP   1840798 A1   10/2007
(Continued)

OTHER PUBLICATIONS

"4.1 Points and patches" In: Szeliski Richard: "Computer Vision—Algorithms and Applications", 2011, Springer-Verlag, London, XP002696110, p. 195, ISBN: 978-1-84882-934-3.
(Continued)

*Primary Examiner* — Aung S Moe
(74) *Attorney, Agent, or Firm* — Silicon Valley Patent Group LLP

(57) ABSTRACT

An electronic device and method use a camera to capture an image of an environment outside followed by identification of regions therein. A subset of the regions is selected, based on attributes of the regions, such as aspect ratio, height, and variance in stroke width. Next, a number of angles that are candidates for use as skew of the image are determined (e.g. one angle is selected for each region. based on peakiness of a histogram of the region, evaluated at different angles). Then, an angle that is most common among these candidates is identified as the angle of skew of the image. The just-described identification of skew angle is performed prior to classification of any region as text or non-text. After skew identification, at least all regions in the subset are rotated by negative of the skew angle, to obtain skew-corrected regions for use in optical character recognition.

25 Claims, 10 Drawing Sheets

(51) Int. Cl.
*G06T 3/60* (2006.01)
*G06K 9/32* (2006.01)

(56) References Cited

U.S. PATENT DOCUMENTS

| | | | |
|---|---|---|---|
| 5,321,768 A | 6/1994 | Fenrich et al. | |
| 5,459,739 A | 10/1995 | Handley et al. | |
| 5,465,304 A | 11/1995 | Cullen et al. | |
| 5,519,786 A | 5/1996 | Courtney et al. | |
| 5,563,403 A * | 10/1996 | Bessho et al. | 250/208.1 |
| 5,633,954 A | 5/1997 | Gupta et al. | |
| 5,751,850 A | 5/1998 | Rindtorff | |
| 5,764,799 A | 6/1998 | Hong et al. | |
| 5,768,451 A | 6/1998 | Hisamitsu et al. | |
| 5,805,747 A | 9/1998 | Bradford | |
| 5,835,633 A | 11/1998 | Fujisaki et al. | |
| 5,844,991 A | 12/1998 | Hochberg et al. | |
| 5,978,443 A | 11/1999 | Patel | |
| 6,023,536 A | 2/2000 | Visser | |
| 6,266,439 B1 | 7/2001 | Pollard et al. | |
| 6,393,443 B1 | 5/2002 | Rubin et al. | |
| 6,473,517 B1 | 10/2002 | Tyan et al. | |
| 6,674,919 B1 | 1/2004 | Ma et al. | |
| 6,678,415 B1 | 1/2004 | Popat et al. | |
| 6,687,421 B1 | 2/2004 | Navon | |
| 6,738,512 B1 | 5/2004 | Chen et al. | |
| 6,954,795 B2 | 10/2005 | Takao et al. | |
| 7,142,727 B2 * | 11/2006 | Notovitz et al. | 382/289 |
| 7,263,223 B2 | 8/2007 | Irwin | |
| 7,333,676 B2 | 2/2008 | Myers et al. | |
| 7,403,661 B2 | 7/2008 | Curry et al. | |
| 7,450,268 B2 | 11/2008 | Martinez et al. | |
| 7,471,830 B2 * | 12/2008 | Lim et al. | 382/181 |
| 7,724,957 B2 | 5/2010 | Abdulkader | |
| 7,738,706 B2 | 6/2010 | Aradhye et al. | |
| 7,783,117 B2 | 8/2010 | Liu et al. | |
| 7,817,855 B2 | 10/2010 | Yuille et al. | |
| 7,889,948 B2 | 2/2011 | Steedly et al. | |
| 7,961,948 B2 | 6/2011 | Katsuyama | |
| 7,984,076 B2 | 7/2011 | Kobayashi et al. | |
| 8,009,928 B1 | 8/2011 | Manmatha et al. | |
| 8,189,961 B2 | 5/2012 | Nijemcevic et al. | |
| 8,194,983 B2 | 6/2012 | Al-Omari et al. | |
| 8,285,082 B2 | 10/2012 | Heck | |
| 8,306,325 B2 | 11/2012 | Chang | |
| 8,417,059 B2 * | 4/2013 | Yamada | 382/283 |
| 8,542,926 B2 | 9/2013 | Panjwani et al. | |
| 8,644,646 B2 | 2/2014 | Heck | |
| 8,831,381 B2 * | 9/2014 | Baheti et al. | 382/289 |
| 2003/0026482 A1 | 2/2003 | Dance | |
| 2003/0099395 A1 | 5/2003 | Wang et al. | |
| 2003/0215137 A1 | 11/2003 | Wnek | |
| 2004/0179734 A1 | 9/2004 | Okubo | |
| 2004/0240737 A1 | 12/2004 | Lim et al. | |
| 2005/0041121 A1 | 2/2005 | Steinberg et al. | |
| 2005/0123199 A1 | 6/2005 | Mayzlin et al. | |
| 2005/0238252 A1 | 10/2005 | Prakash et al. | |
| 2006/0039605 A1 | 2/2006 | Koga | |
| 2006/0215231 A1 | 9/2006 | Borrey et al. | |
| 2006/0291692 A1 | 12/2006 | Nakao et al. | |
| 2007/0116360 A1 | 5/2007 | Jung et al. | |
| 2007/0217676 A1 | 9/2007 | Grauman et al. | |
| 2008/0008386 A1 | 1/2008 | Anisimovich et al. | |
| 2008/0063273 A1 * | 3/2008 | Shimodaira | 382/171 |
| 2008/0112614 A1 | 5/2008 | Fluck et al. | |
| 2009/0060335 A1 * | 3/2009 | Rodriguez Serrano et al. | 382/177 |
| 2009/0202152 A1 | 8/2009 | Takebe et al. | |
| 2009/0232358 A1 | 9/2009 | Cross | |
| 2009/0252437 A1 | 10/2009 | Li et al. | |
| 2009/0316991 A1 | 12/2009 | Geva et al. | |
| 2009/0317003 A1 | 12/2009 | Heilper et al. | |
| 2010/0049711 A1 | 2/2010 | Singh et al. | |
| 2010/0067826 A1 * | 3/2010 | Honsinger et al. | 382/280 |
| 2010/0080462 A1 | 4/2010 | Miljanic et al. | |
| 2010/0128131 A1 | 5/2010 | Tenchio et al. | |
| 2010/0141788 A1 | 6/2010 | Hwang et al. | |
| 2010/0144291 A1 | 6/2010 | Stylianou et al. | |
| 2010/0172575 A1 | 7/2010 | Lukac et al. | |
| 2010/0195933 A1 * | 8/2010 | Nafarieh | 382/289 |
| 2010/0232697 A1 | 9/2010 | Mishima et al. | |
| 2010/0239123 A1 | 9/2010 | Funayama et al. | |
| 2010/0245870 A1 | 9/2010 | Shibata | |
| 2010/0272361 A1 | 10/2010 | Khorsheed et al. | |
| 2010/0296729 A1 | 11/2010 | Mossakowski | |
| 2011/0052094 A1 * | 3/2011 | Gao et al. | 382/296 |
| 2011/0081083 A1 | 4/2011 | Lee et al. | |
| 2011/0188756 A1 | 8/2011 | Lee et al. | |
| 2011/0215147 A1 | 9/2011 | Goncalves et al. | |
| 2011/0222768 A1 | 9/2011 | Galic et al. | |
| 2011/0249897 A1 | 10/2011 | Chaki et al. | |
| 2011/0274354 A1 | 11/2011 | Nijemcevic | |
| 2011/0280484 A1 | 11/2011 | Ma et al. | |
| 2011/0285873 A1 * | 11/2011 | Showering | 348/231.99 |
| 2012/0051642 A1 | 3/2012 | Berrani et al. | |
| 2012/0066213 A1 | 3/2012 | Ohguro | |
| 2012/0092329 A1 * | 4/2012 | Koo et al. | 345/419 |
| 2012/0114245 A1 * | 5/2012 | Lakshmanan et al. | 382/186 |
| 2012/0155754 A1 * | 6/2012 | Chen et al. | 382/164 |
| 2013/0001295 A1 | 1/2013 | Goncalves | |
| 2013/0058575 A1 * | 3/2013 | Koo et al. | 382/176 |
| 2013/0129216 A1 | 5/2013 | Tsai et al. | |
| 2013/0194448 A1 | 8/2013 | Baheti et al. | |
| 2013/0195315 A1 | 8/2013 | Baheti et al. | |
| 2013/0195360 A1 | 8/2013 | Krishna Kumar et al. | |
| 2013/0195376 A1 * | 8/2013 | Baheti et al. | 382/289 |
| 2013/0308860 A1 | 11/2013 | Mainali et al. | |
| 2014/0003709 A1 | 1/2014 | Ranganathan et al. | |
| 2014/0023270 A1 | 1/2014 | Baheti et al. | |
| 2014/0023271 A1 | 1/2014 | Baheti et al. | |
| 2014/0023273 A1 | 1/2014 | Baheti et al. | |
| 2014/0023274 A1 * | 1/2014 | Barman et al. | 382/182 |
| 2014/0023275 A1 | 1/2014 | Krishna Kumar et al. | |
| 2014/0023278 A1 | 1/2014 | Krishna Kumar et al. | |
| 2014/0161365 A1 * | 6/2014 | Acharya et al. | 382/229 |
| 2014/0168478 A1 * | 6/2014 | Baheti et al. | 348/240.99 |

FOREIGN PATENT DOCUMENTS

| | | |
|---|---|---|
| EP | 2192527 A1 | 6/2010 |
| GB | 2453366 A | 4/2009 |
| GB | 2468589 A | 9/2010 |
| WO | 2004077358 A1 | 9/2004 |

OTHER PUBLICATIONS

Agrawal, et al., "Generalization of Hindi OCR Using Adaptive Segmentation and Font Files," V. Govindaraju, S. Setlur (eds.), Guide to OCR for Indic Scripts, Advances in Pattern Recognition, DOI 10.10071978-1-84800-330-9_10, Springer-Verlag London Limited 2009, pp. 181-207.

Agrawal M., et al., "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193, ISBN: 978-1-84888-329-3.

Chaudhuri et al., "Skew Angle Detection of Digitized Indian Script Documents", IEEE Transactions on Pattern Analysis and Machine Intelligence, Feb. 1997, pp. 182-186, vol. 19, No. 2.

Chen, et al., "Detecting and reading text in natural scenes," IEEE Computer Society Conference on Computer Vision and Pattern Recognition (CVPR'04), 2004, pp. 1-8.

Chen H., et al., "Robust Text Detection in Natural Images With Edge-Enhanced Maximally Stable Extremal Regions," believed to be published in IEEE International Conference on Image Processing (ICIP), Sep. 2011, pp. 1-4.

Chowdhury A.R. et al., "Text Detection of Two Major Indian Scripts in Natural Scene Images", Sep. 22, 2011, Camera-Based Document Analysis and Recognition, Springer Berlin Heidelberg, pp. 42-57, XP019175802, ISBN: 978-3-642-29363-4.

Dlagnekov L., et al., "Detecting and Reading Text in Natural Scenes," Oct. 2004, pp. 1-22.

(56) References Cited

OTHER PUBLICATIONS

Elgammal A.M., et al., "Techniques for Language Identification for Hybrid Arabic-English Document Images," believed to be published in 2001 in Proceedings of IEEE 6th International Conference on Document Analysis and Recognition, pp. 1-5.

Ghoshal R., et al., "Headline Based Text Extraction from Outdoor Images", 4th International Conference on Pattern Recognition and Machine Intelligence, Springer LNCS, vol. 6744, Jun. 27, 2011, pp. 446-451, XP055060285.

Holmstrom L., et al., "Neural and Statistical Classifiers—Taxonomy and Two Case Studies," IEEE Transactions on Neural Networks, Jan. 1997, pp. 5-17, vol. 8 (1).

Jain A.K., et al., "Automatic Text Location in Images and Video Frames," believed to be published in Proceedings of Fourteenth International Conference on Pattern Recognition, vol. 2, Aug. 1998, pp. 1497-1499.

Jain, et al., "Automatic text location in images and video frames", Pattern Recognition, 1998, pp. 2055-2076, vol. 31, No. 12.

Jayadevan, et al., "Offline Recognition of Devanagari Script: A Survey", IEEE Transactions on Systems, Man, and Cybernetics—Part C: Applications and Reviews, 2010, pp. 1-15.

Kapoor et al., "Skew angle detection of a cursive handwritten Devanagari script character image", Indian Institute of Science, May-Aug. 2002, pp. 161-175.

Machine Learning, retrieved from http://en.wikipedia.org/wiki/Machine_learning, May 7, 2012, pp. 1-8.

Matas, et al., "Robust Wide Baseline Stereo from Maximally Stable Extremal Regions", 2002, pp. 384-393.

Mikulik, et al., "Construction of Precise Local Affine Frames," Center for Machine Perception, Czech Technical University in Prague, Czech Republic, pp. 1-5, Abstract and second paragraph of Section 1; Algorithms 1 & 2 of Section 2 and Section 4, International Conference on Pattern Recognition, 2010, pp. 1-5.

Moving Average, retrieved from http://en.wikipedia.org/wiki/Moving_average, Jan. 23, 2013, pp. 1-5.

Nister D., et al., "Linear Time Maximally Stable Extremal Regions," ECCV, 2008, Part II, LNCS 5303, pp. 183-196, published by Springer-Verlag Berlin Heidelberg.

Pal, et al., "Indian script character recognition: a survey", Pattern Recognition Society, Published by Elsevier Ltd, 2004, pp. 1887-1899.

Papandreou A. et al., "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.

Pardo M., et al., "Learning From Data: A Tutorial With Emphasis on Modern Pattern Recognition Methods," IEEE Sensors Journal, Jun. 2002, pp. 203-217, vol. 2 (3).

Park, J-M. et al., "Fast Connected Component Labeling Algorithm Using a Divide and Conquer Technique," believed to be published in Matrix (2000), vol. 4 (1), pp. 4-7, Publisher: Elsevier Ltd.

Renold M., "Detecting and Reading Text in Natural Scenes," Master's Thesis, May 2008, pp. 1-59.

Setlur, et al., "Creation of data resources and design of an evaluation test bed for Devanagari script recognition", Research Issues in Data Engineering: Multi-lingual Information Management, RIDE-MLIM 2003. Proceedings. 13th International Workshop, 2003, pp. 55-61.

Shin H., et al., "Application of Floyd-Warshall Labelling Technique: Identification of Connected Pixel Components in Binary Image," Kangweon-Kyungki Math. Jour. 14(2006), No. 1, pp. 47-55.

Vedaldi A., "An Implementation of Multi-Dimensional Maximally Stable Extremal Regions" Feb. 7, 2007, pp. 1-7.

VLFeat—Tutorials—MSER, retrieved from http://www.vlfeat.org/overview/mser.html, Apr. 30, 2012, pp. 1-2.

Li, et al. "Automatic Text Detection and Tracking in a Digital Video", IEEE Transactions on Image Processing, Jan. 2000, pp. 147-156, vol. 9 No. 1.

Lee, et al. "A new methodology for gray-scale character segmentation and recognition," IEEE Transactions on Pattern Analysis and Machine Intelligence, Oct. 1996, pp. 1045-1050, vol. 18, No. 10.

Epshtein, et al. "Detecting text in natural scenes with stroke width transform," Computer Vision and Pattern Recognition (CVPR) 2010, pp. 1-8, (as downloaded from "http://research.microsoft.com/pubs/149305/1509.pdf").

Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.

Chaudhuri B.B., et al., "An OCR system to read two Indian language scripts: Bangla and Devnagari (Hindi)", Proceedings of the 4th International Conference on Document Analysis and Recognition (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.

Chaudhury S (Eds.): "OCR Technical Report for the project Development of Robust Document Analysis and Recognition System for Printed Indian Scripts", 2008, pp. 149-153, XP002712777, Retrieved from the Internet: URL:http://researchweb.iiit.ac.inj-jinesh/ocrDesignDoc.pdf [retrieved on Sep. 5, 2013].

Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.

Forssen P.E., et al., "Shape Descriptors for Maximally Stable Extremal Regions", Computer Vision, 2007. ICCV 2007. IEEE 11th International Conference on, IEEE, PI, Oct. 1, 2007, pp. 1-8, XP031194514, ISBN: 978-1-4244-1630-1 abstract Section 2. Multi-resoltuion MSER.

International Search Report and Writtwen Opinion—PCT/US2013/049391—ISA/EPO—Sep. 20, 2013.

Minoru M., Ed., "Character Recognition", Aug. 2010, Sciyo, XP002715748, ISBN: 978-953-307-105-3 pp. 91-95, p. 92, section "7.3 Baseline Detection Process".

Pal U et al., "Multi-skew detection of Indian script documents" Document Analysis and Recognition, 2001. Proceedings. Sixth International Conference on Seattle, WA, USA Sep. 10-13, 2001, Los AAlmitos, CA, USA, IEEE Comput. Soc. US. Sep. 10, 2001, pp. 292-293, XP010560519, DOI:10.1109/ICDAR.2001.953801, ISBN: 978-0-7695-1263-1.

Pal U., et al., "OCR in Bangla: an Indo-Bangladeshi language", Pattern Recognition, 1994. vol. 2—Conference B: Computer Vision & Image Processing., Proceedings of the 12th IAPR International. Conferenc E on Jerusalem, Israel Oct. 9-13, 1994, Los Alamitos, CA, USA, IEEE Comput. Soc, vol. 2, Oct. 9, 1994, pp. 269-273, XP010216292, DOI: 10.1109/ICPR.1994.576917 ISBN: 978-0-8186-6270-6 the whole document.

Premaratne H.L., et al., "Lexicon and hidden Markov model-based optimisation of the recognised Sinhala script", Pattern Recognition Letters, Elsevier, Amsterdam, NL, vol. 27, No. 6, Apr. 15, 2006, pp. 696-705, XP027922538, ISSN: 0167-8655.

Ray A.K et al., "Information Technology—Principles and Applications". 2004. Prentice-Hall of India Private Limited. New Delhi! XP002712579, ISBN: 81-203-2184-7 , pp. 529-531.

Senda S., et al., "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.

Senk V., et al., "A new bidirectional algorithm for decoding trellis codes," EUROCON' 2001, Trends in Communications, International Conference on Jul. 4-7, 2001, Piscataway, NJ, USA, IEEE, Jul. 4, 2001, pp. 34-36, vol. .I, XP032155513, DOI: 10.1109/EURCON.2001.937757 ISBN: 978-0-7803-6490-5.

Sinha R.M.K., et al., "On Devanagari document processing", Systems, Man and Cybernetics, 1995. Intelligent Systems for the 21st Century., IEEE International Conference on Vancouver, BC, Canada Oct. 22-25, 1995, New York, NY, USA,IEEE, US, vol. 2, Oct. 22, 1995, pp. 1621-1626, XP010194509, DOI: 10.1109/ICSMC. 1995. 538004 ISBN: 978-0-7803-2559-3 the whole document.

(56) References Cited

OTHER PUBLICATIONS

Uchida S et al., "Skew Estimation by Instances", 2008 The Eighth IAPR International Workshop on Document Analysis Systems, Sep. 1, 2008, pp. 201-208, XP055078375, DOI: 10.1109/DAS.2008.22, ISBN: 978-0-76-953337-7.

Unser M., "Sum and Difference Histograms for Texture Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand column p. 123.

Chen Y.L., "A knowledge-based approach for textual information extraction from mixed text/graphics complex document images", Systems Man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.

Co-pending U.S. Appl. No. 13/748,562, filed Jan. 23, 2013, (47 pages).

Co-pending U.S. Appl. No. 13/842,985, filed Mar. 15, 2013, (53 pages).

Song Y., et al., "A Handwritten Character Extraction Algorithm for Multi-language Document Image", 2011 International Conference on Document Analysis and Recognition, Sep. 18, 2011, pp. 93-98, XP055068675, DOI: 10.1109/ICDAR.2011.28 ISBN: 978-1-45-771350-7.

Wu V., et al., "TextFinder: An Automatic System to Detect and Recognize Text in Images", IEEE Transactions on Pattern Analysis and Machine Intelligence, vol. 21. No. 11, Nov. 1, 1999, pp. 1224-1229, XP055068381.

\* cited by examiner

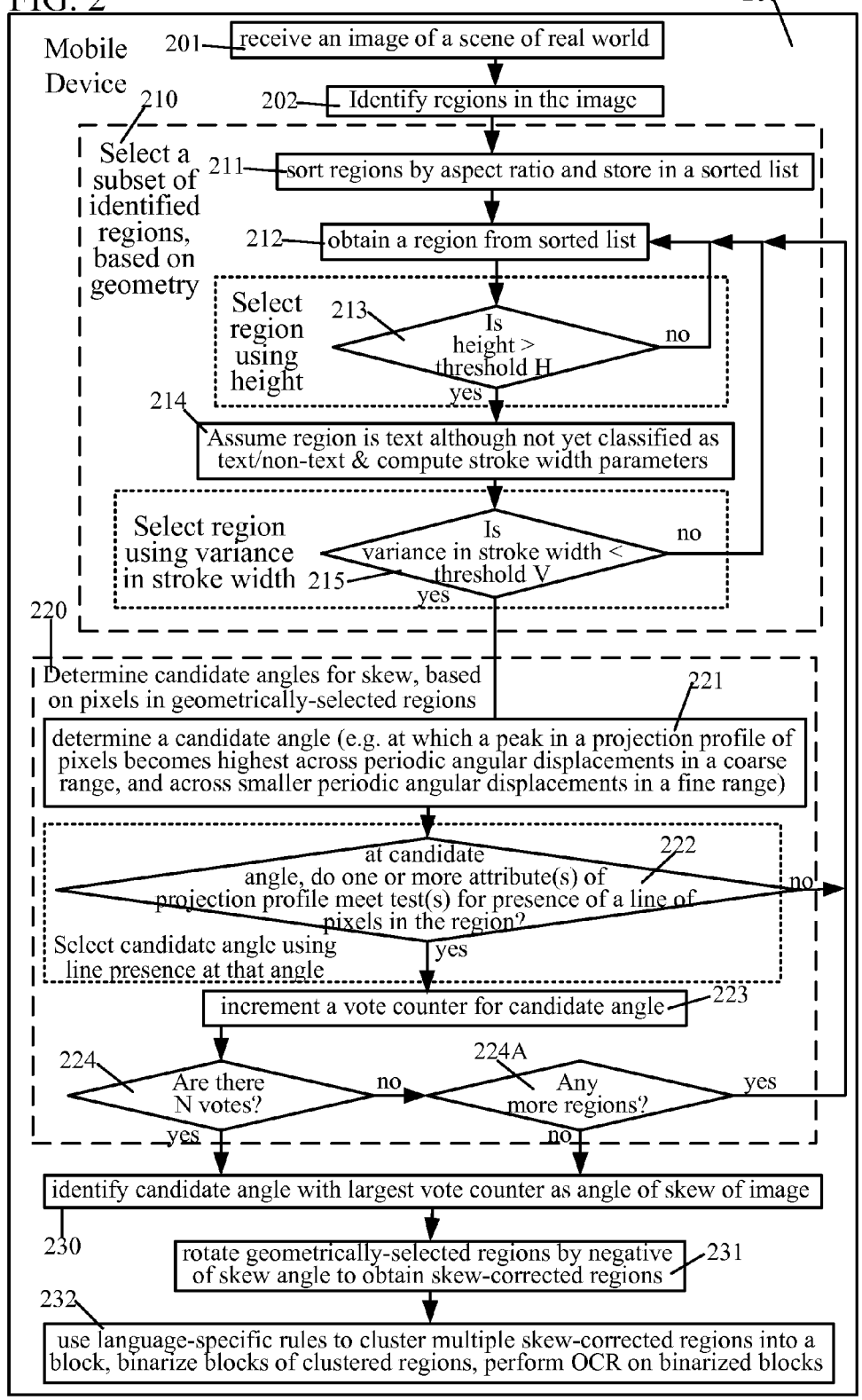

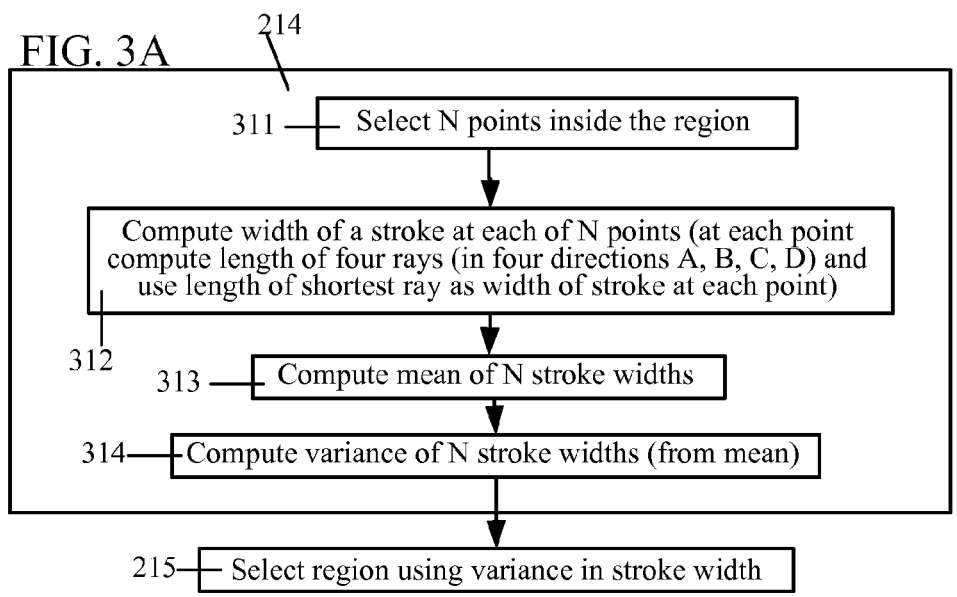
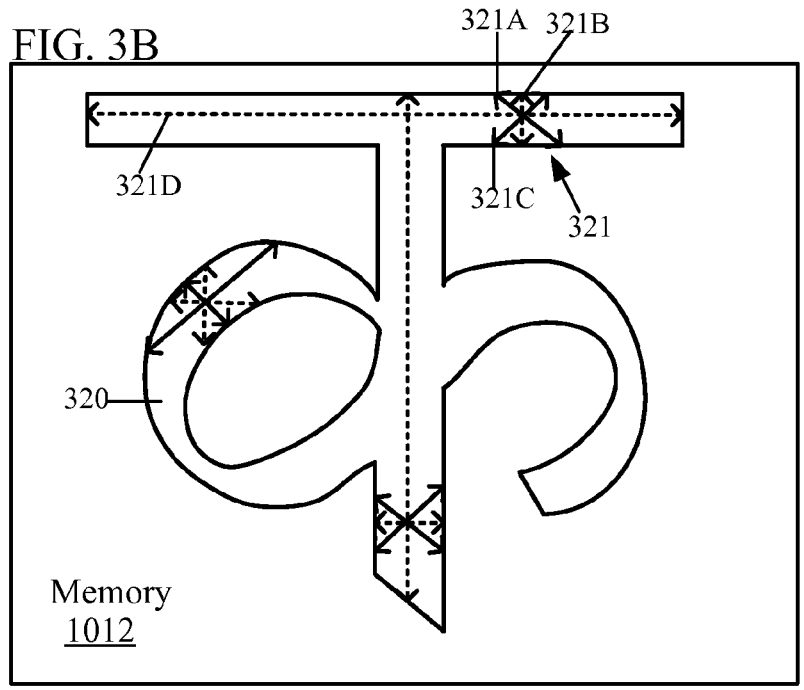

AUTOMATIC CORRECTION OF SKEW IN NATURAL IMAGES AND VIDEO

CROSS-REFERENCE TO PROVISIONAL APPLICATIONS

This application claims priority under 35 USC §119 (e) from U.S. Provisional Application No. 61/673,703 filed on Jul. 19, 2012 and entitled "Automatic Correction of Skew In Natural Images and Video", which is assigned to the assignee hereof and which is incorporated herein by reference in its entirety.

CROSS-REFERENCE TO US APPLICATIONS INCORPORATED BY REFERENCE

This application is related to U.S. application Ser. No. 13/748,539, filed on Jan. 23, 2013, entitled "Identifying Regions Of Text To Merge In A Natural Image or Video Frame" which is assigned to the assignee hereof and which is incorporated herein by reference in its entirety.

This application is related to U.S. application Ser. No. 13/748,574, filed on Jan. 23, 2013, entitled "Rules For Merging Blocks Of Connected Components In Natural Images" which is assigned to the assignee hereof and which is incorporated herein by reference in its entirety.

This application is related to U.S. application Ser. No. 13/748,562, filed Jan. 23, 2013, entitled "Detecting and Correcting Skew In Regions Of Text In Natural Images" which is assigned to the assignee hereof and which is incorporated herein by reference in its entirety.

FIELD

This patent application relates to devices and methods for automatic correction of skew, in regions of natural images or video frames that are not yet classified by a classifier (such as a neural network) as text or non-text.

BACKGROUND

Identification of text regions in documents that are scanned (e.g. by an optical scanner of a printer) is significantly easier than detecting text regions in images of scenes in the real world (also called "natural images") captured by a handheld device. FIG. 1A illustrates a billboard 100 in the real world in India. A user 110 may use a camera-equipped mobile device (such as a cellular phone) 108 to capture an image 107 of billboard 100. Captured image 107 may be displayed on a screen 106 of mobile device 108. Such an image 107 if processed directly by application of prior art techniques used in document processing may result in a failure to classify one or more portions as containing text (see FIG. 1A), e.g. caused by variations in lighting, color, tilt, focus, etc. Specifically, document processing techniques that are successfully used on scanned documents (during Optical Character Recognition, also called OCR) generate too many false positives and/or negatives, so as to be impractical for use on real world images.

Hence, detection of text regions in a real world image is performed using different techniques. For additional information on techniques used in the prior art, to identify text regions in natural images, see the following articles that are incorporated by reference herein in their entirety as background:

LI, et al. "Automatic Text Detection and Tracking in a Digital Video", IEEE Transactions on Image Processing, January 2000, pages 147-156, Volume 9 No. 1;

LEE, et al. "A new methodology for gray-scale character segmentation and recognition," IEEE Transactions on Pattern Analysis and Machine Intelligence, October 1996, pages 1045-1050, vol. 18, no. 10;

EPSHTEIN, et al. "Detecting text in natural scenes with stroke width transform," Computer Vision and Pattern Recognition (CVPR) 2010, pages 1-8, (as downloaded from "http://research.microsoft.com/pubs/149305/1509.pdf").

When a natural image 107 (FIG. 1A) is processed to form blocks (such as block 103) of connected components or regions of interest, some prior art methods of the type described above are agnostic to skew (or orientation) of a word of text (see FIG. 1B) relative to a camera used to generate the image. However, some prior art methods are sensitive to skew, and may fail to correctly identify the block of text when the skew angle is large (e.g. 30° in FIG. 1B). So, there is a need to detect and correct skew in a natural image or video frame, prior to classification of regions, as described below.

SUMMARY

In several aspects of described embodiments, an electronic device and method use a camera to capture an image ("natural image") of an environment outside the electronic device followed by identification of regions therein. A subset of regions in the natural image are selected, based on attributes related to geometry of the regions, such as aspect ratio, height, and variance in stroke width. For each region in the subset (also called "text region"), an angle that is a candidate for use as skew of text in the natural image is determined, and then one or more candidate angles are selected based on presence of a line of pixels in the region (such as a headline or shiro-rekha in Hindi) that occurs at the candidate angle identified by the region. Then, an angle that is most common among the selected candidate angles is identified, as the angle of skew of text in the image. The just-described identification of skew angle is performed prior to classification of any region as text or non-text. After skew identification, at least all regions in the subset are rotated automatically by negative of the skew angle, to obtain skew-corrected regions for use in optical character recognition.

It is to be understood that several other aspects of the described embodiments will become readily apparent to those skilled in the art from the description herein, wherein it is shown and described various aspects by way of illustration. The drawings and detailed description below are to be regarded as illustrative in nature.

BRIEF DESCRIPTION OF THE DRAWINGS

FIG. 2 illustrates, in a high-level flow chart, various acts performed by a mobile device in some aspects of the described embodiments.

FIG. 3A illustrates, in an intermediate-level flow chart, various acts performed by a mobile device to compute width of a region's portion assuming the portion is a stroke, in some aspects of act 214 of FIG. 2 in certain described embodiments.

FIG. 3B illustrates a region of an image wherein stroke width is computed as shown in FIG. 3A.

DETAILED DESCRIPTION

Figure 1A:
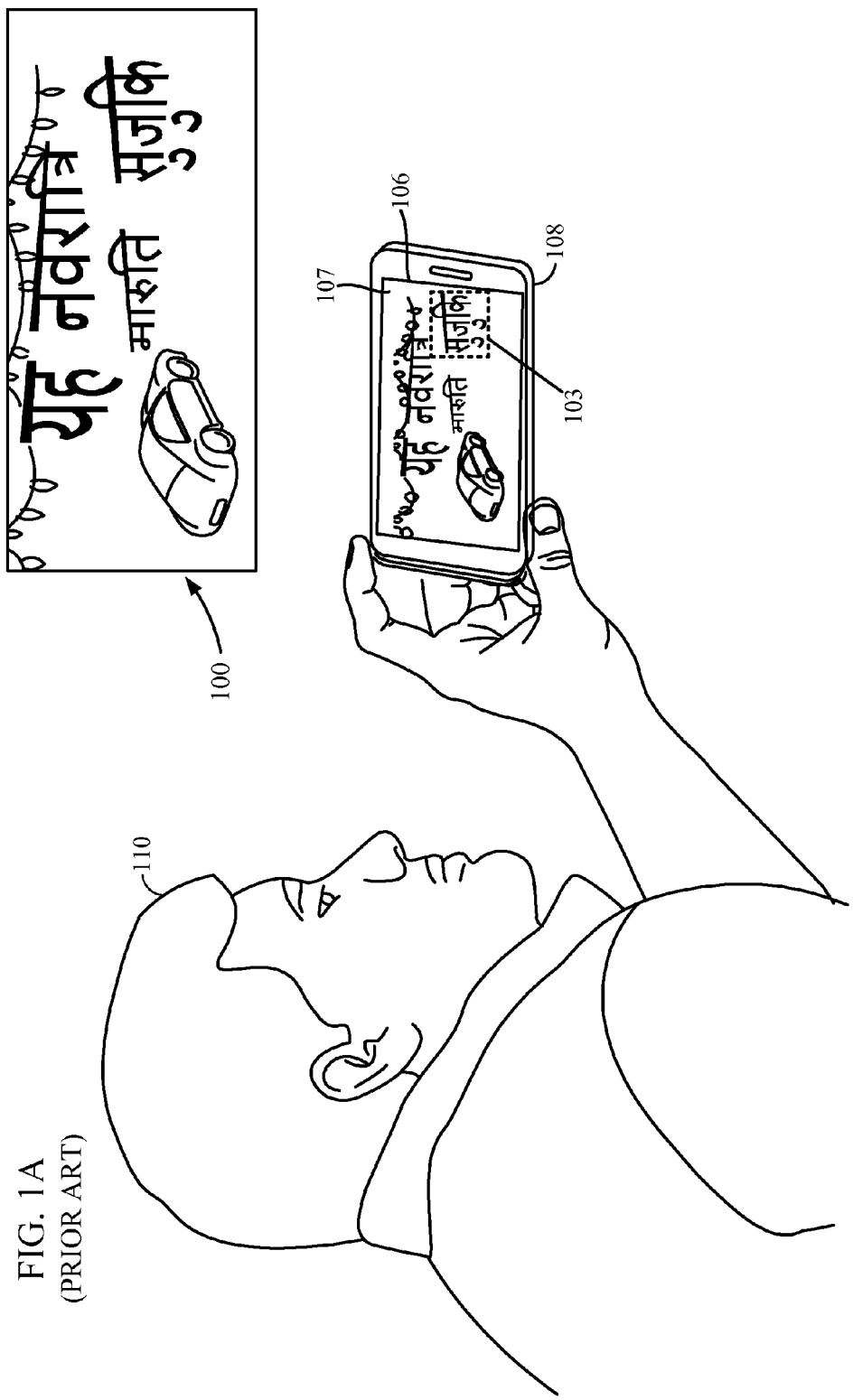
FIG. 1A illustrates a user using a camera-equipped mobile device of the prior art to capture an image of a billboard in the real world.
Figure 1B:
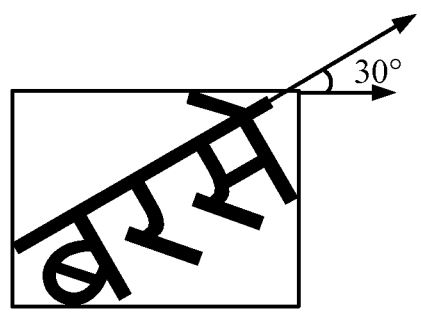
FIG. 1B illustrates a skew angle of 30° for the word बरसे in a rectangular block of the prior art.

In several aspects of described embodiments, an electronic device 200 and method use a camera to capture an image (or a frame of video) of an environment outside the electronic device followed by identification of regions therein.

A subset of the identified regions is selected as per operation 210 (FIG. 2), based on attributes related to geometry of the regions, such as aspect ratio, height, and variance in width of a region's portion. The just-described identification of regions of a natural image based on geometry is performed prior to classification of any region as text or non-text, although one or more tests applied in operation 210 assume the region is text and compute parameters of text-containing regions, such as stroke width. Thereafter, a number of angles that are candidates for use as skew of text in the image are determined as per operation 220 (FIG. 2) based on locations of pixels within a minimum rectangle (or bounding box) around each of a corresponding number of geometrically-selected regions.

Then, in operation 230, an angle that is most common among these candidates is identified as the angle of skew of the image. The just-described identification of skew angle is performed in some embodiments prior to classification of any region as text or non-text. After skew identification, at least all regions in the subset selected in operation 210 are rotated by negative of the skew angle as per act 231 to obtain skew-corrected regions, followed by some of these regions being clustered, and again binarized, followed by their use in optical character recognition (OCR) in act 232. In some embodiments of act 231, all connected components (or MSER regions) in the image are rotated by negative of the skew angle.

Figure 6:
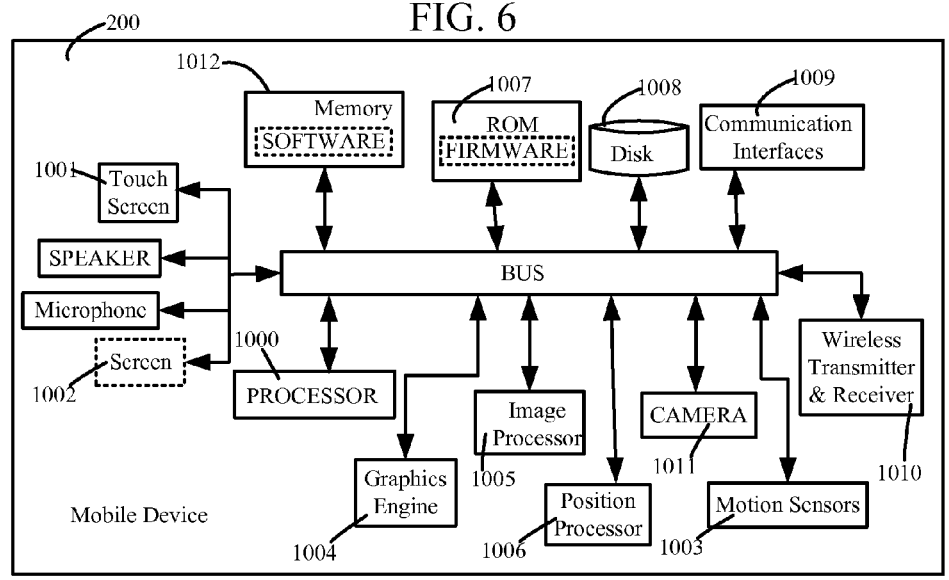
FIG. 6 illustrates, in a block diagram, a mobile device including processor and memory of the type described above, in some aspects of the described embodiments.

The above-described operations 210-230 are performed in some illustrative embodiments of a mobile device 200 as follows. Initially, in a first step 201, an image (or a frame of video) of a scene of real world is received by one or more processors 1000 from a camera 1011 (FIG. 6) in mobile device 200. Next, in act 202 the one or more processors 1000 identify regions of interest in the received image, e.g. by performing any known MSER method. Thereafter, the one or more processors 1000 perform an operation 210 which may be implemented by acts 211-215 to automatically select a subset of regions, from among a set of regions identified in the image (in act 202), at least based on geometric attributes of regions in the subset of regions.

Figure 5A:
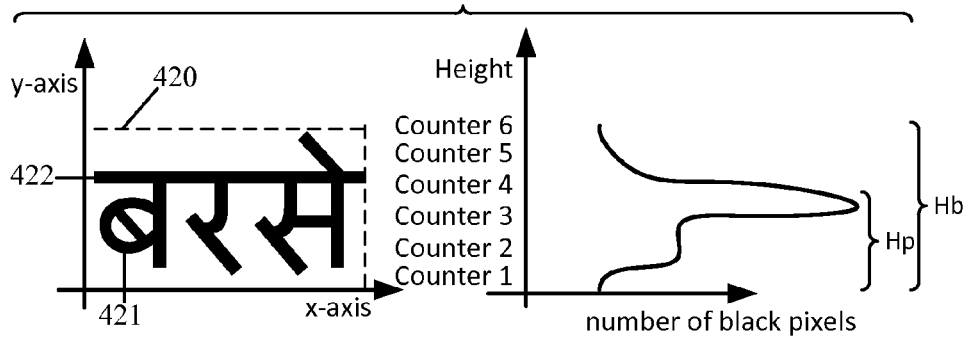
FIG. 5A illustrates use of a line-presence test that checks if the maximum of the projections (peak projection) exceeds the mean of the projections (mean projection) by a certain factor.

Accordingly, in some embodiments, one or more processors 1000 programmed with software to perform operation 210 (which may be implemented by acts 211-215), constitutes means for selecting. In act 211, one or more processors 1000 sort the regions by aspect ratio and store them in memory 1012 in a sorted list. Then, a region is obtained from the sorted list in act 212, followed by an act 213 in which the height Hb (see FIG. 5A) of the region is checked. If the height Hb is less than a predetermined threshold H (e.g. 40 pixels), one or more processors 1000 return from act 213 back to act 212 to obtain and process another region from the sorted list.

When a region is found by one or more processors 1000 to have a height greater than threshold in act 213, then operation 214 is performed. Specifically, in operation 214, the one or more processors 1000 compute width of the region (e.g. stroke width) at several points in the region and also and determine variance in width (although at this stage it is not yet known whether the region is text or non-text). Then, in act 215, the just-described parameters are checked against predetermined threshold(s) thereon, e.g. whether variance in stroke width is less than threshold (e.g. less than 3) and if not, one or more processors 1000 return to act 212. Some embodiments use as threshold, a predetermined percentage (e.g. 10 percent) of height Hb of a region. For example, a region having a height of 40 pixels may be checked using 4 as threshold. When the answer in act 215 is true, then operation 220 is performed by one or more processors 1000 in certain embodiments.

In summary, by performance of acts 213-215 in operation 210, one or more processors 1000 automatically select a subset of regions (e.g. 10 connected components or MSER regions), from among a set of regions identified in the image, based on one or more geometric attributes of the regions. Note that different geometric attributes can be used in different embodiments of operation 210, to filter out regions that are unlikely to be text (or select regions that are likely to contain text).

When a region is found by one or more processors 1000 to have passed the tests on geometric attributes in operation 210, then the region is marked in memory 1012 as selected and operation 220 is performed. Accordingly, in some embodiments, one or more processors 1000 programmed with software to perform operation 220 (which may be implemented by acts 221-224), constitutes means for determining. Specifically, in act 221, the one or more processors 1000 determine a candidate angle for skew of text in the region. For example, in some embodiments, the one or more processors 1000 determine a candidate angle for skew to be any angle at which a peak of a projection profile of pixels in the region becomes highest across periodic angular displacements in a coarse range, and then this process is repeated at smaller periodic angular displacements in a fine range.

At this stage, in several embodiments, an additional test is performed in an act 222 based on the candidate angles that are determined in act 221, to select certain candidate angles as being appropriate for use in a voting process (described below in reference to act 223. Specifically, in some embodiments of act 222, the one or more processors 1000 use a projection profile in the direction of the candidate angle to check whether a test is met for presence of a straight line of pixels that is oriented in the direction of the candidate angle. If this test is not met in act 222, e.g. if the projection profile does not have a peak (or maxima) that is sufficient to meet a test indicative of steepness of a maxima in the profile (also called "peakiness"), and/or if a peak in the profile is not located in an upper half or upper one-third of the region (where a headline or shiro-rekha is normally present in a region of text expressed in the language Hindi), then the one or more processors 1000 return to act 212 in operation 210 to process another region in the above-described manner.

When a test for line presence is met at a candidate angle for a region in act 222, the one or more processors 1000 perform act 223 to implement a voting process, e.g. increment a counter that is associated with the candidate angle. The just-described counter indicates the number of times such a candidate angle has been found in the image. Act 223 is followed by checking in act 224 whether a predetermined number of total votes have been received for the image as a whole (e.g. check whether a total of all counters for candidate angles exceeds a predetermined minimum, such as 10). If the answer in act 224 is no, then the one or more processors 1000 check (in act 224A) whether there are any more regions and if so return to act 212 in operation 210 to process another region in the above-described manner. When the answer in act 224A is no, then operation 220 is completed and the one or more processors 1000 go to operation 230. When the answer in act 224 is yes, then also operation 220 is completed and the one or more processors 1000 go to operation 230. In operation 230, the one or more processors 1000 identify any candidate angle which has the largest counter, as an angle of skew of text in the image. Accordingly, in some embodiments, one or more processors 1000 programmed with software to perform operation 230, constitutes means for identifying as an angle of skew of the image, a most common candidate angle (based on having the largest counter).

Subsequently, in act 231, the one or more processors 1000 use negative of the just-described skew angle to rotate at least the regions that were geometrically-selected (by operation 210), thereby to obtain skew-corrected versions of these regions. Accordingly, in some embodiments, one or more processors 1000 programmed with software to perform act 231, constitutes means for rotating by negative of the angle of skew of the image, at least a subset of regions.

The skew-corrected regions are then processed further to identify words of text, e.g. in act 232 one or more language-specific rule are used to cluster multiple skew-corrected regions to identify a rectangular portion of the image, followed by binarization of the rectangular portion, followed by segmentation of the binarized rectangular portion into blocks that are candidates to be recognized as characters, followed by each block being subject to optical character recognition (OCR), etc.

In some illustrative embodiments, processor 1000 performs acts 311-314 (FIG. 3A) to implement the operation 214. Specifically, in act 311, processor 1000 selects N points inside a region 320 (FIG. 3B), such as the point 321. Next, in act 312 processor 1000 compute width of a stroke at each of the N points. For example, at point 321, processor 1000 computes the length of four rays 321A, 321B, 321C, and 321D (FIG. 3B) and then uses the length of ray 321B (FIG. 3B) which is shortest (among the four rays) as width of the stroke at point 321. Then, in act 313, processor 1000 computes the mean of N such stroke widths for the region 320. Finally, in act 314, processor 1000 computes standard deviation and/or variance of the N stroke widths (from the mean). Then as noted above, an act 215 is performed to check if the variance is less than a predetermined threshold, and if so the region is selected to be included in a subset that results from performance of operation 210 as noted above.

Figure 4A:
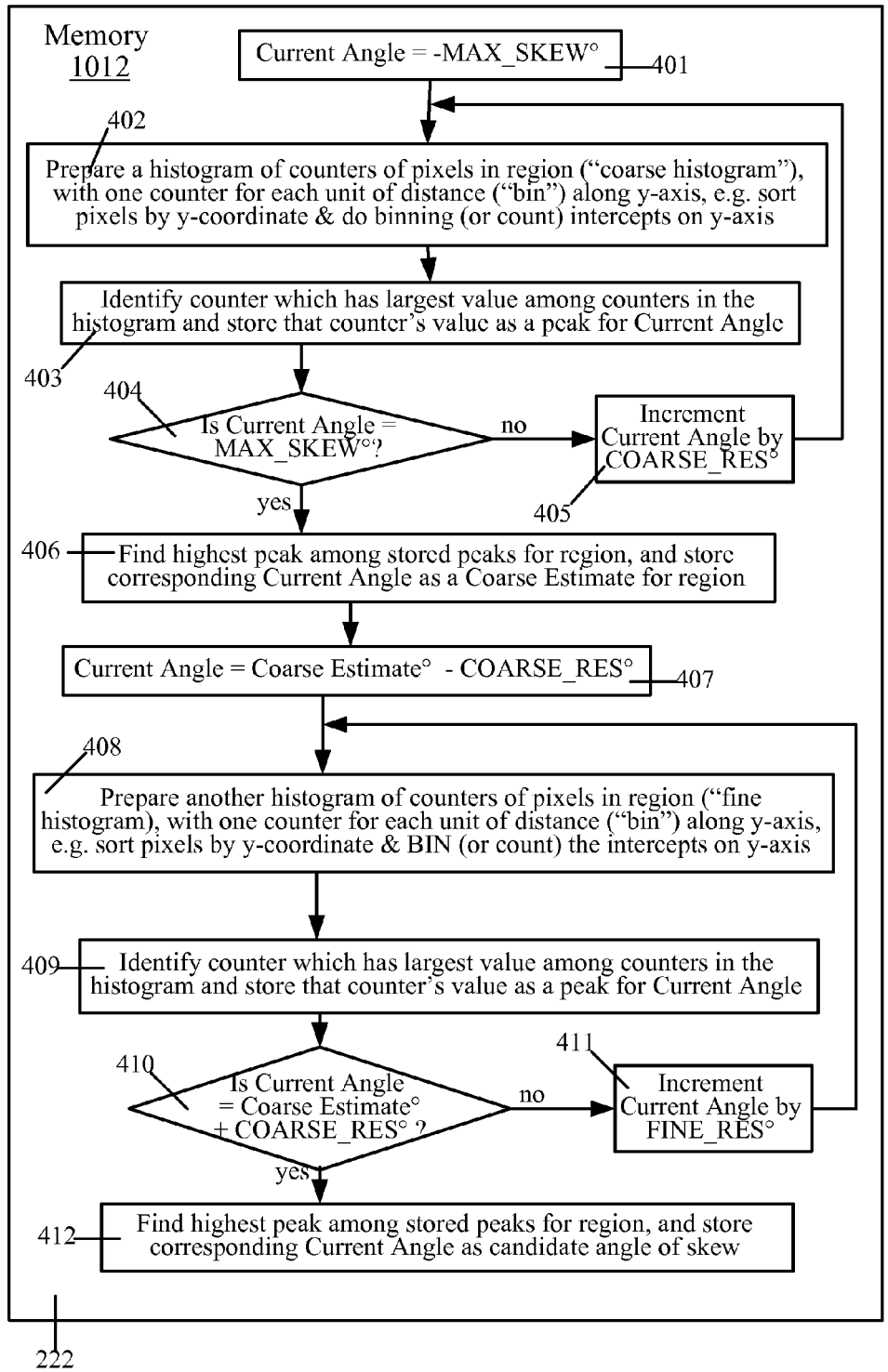
FIG. 4A illustrates, in an intermediate-level flow chart, various acts performed by a mobile device to determine a candidate angle of a region in some aspects of act 222 of FIG. 2 in certain described embodiments.
Figure 4B:
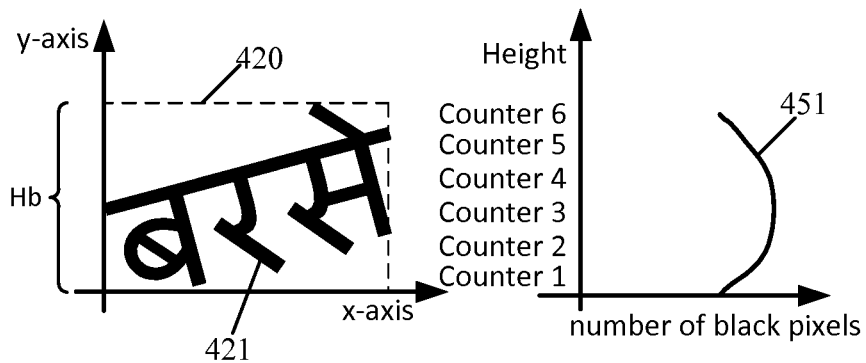
FIGS. 4B and 4C illustrates the region of FIG. 3B, wherein a candidate angle is computed as shown in FIG. 4A.

In several illustrative embodiments, processor 1000 performs acts 401-412 of the type illustrated in FIG. 4A and discussed next, to determine a candidate angle of a region in some aspects of act 222 of FIG. 2. Specifically, in act 401, processor 1000 sets a variable for the current angle to a predetermined limit, namely −MAX_SKEW°. Thereafter, in act 402, processor 100 prepares a histogram ("coarse histogram") of counters, of pixels of a specific binary value (e.g. black pixels) in corresponding rows in a rectangular bounding box (or minimum rectangle) that constitute a region, with one counter for each row having a height of a unit of distance (also called "bin") along the y-axis. For example, six counters for black pixels that constitute a region 421 in box 420 are shown in FIG. 4B, equally spaced along a height Hb of box 420 of region 421.

Figure 4C:
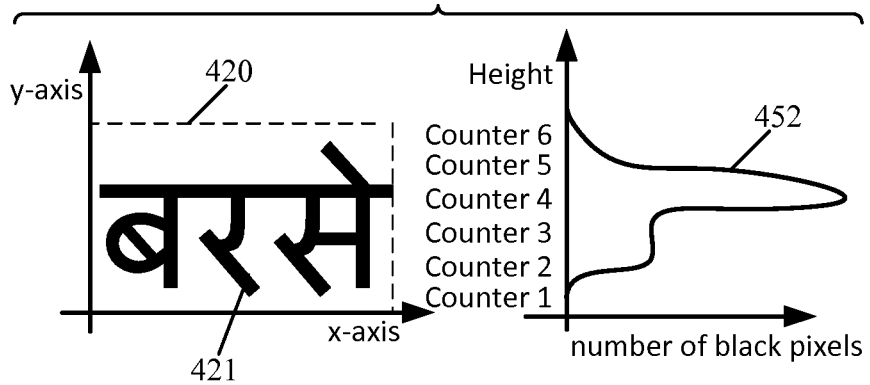

In some embodiments, each pixel of the specific binary value indicative of text (e.g. each black pixel) in the region 421 within box 420 is identified by its two coordinates (x, y), e.g. with origin at the bottom left corner of box 420. Such pixels are sorted in some embodiments, by their y-coordinates (ignoring x-coordinates), followed by counting the number of pixels that occur within each unit distance along the y-axis. Specifically, some embodiments bin the y-coordinates of pixels of the specific binary value (e.g. received from a MSER process, in a list that identifies a region), to obtain values of the counters that when plotted as a function of height Hb, form a profile or histogram 451 as shown in FIG. 4B. When a word of text formed by the region 421 is skewed (e.g. relative to an upright orientation of the image, not shown), a histogram 451 of counters forms a profile that is somewhat flat (as illustrated in FIG. 4B) when compared to peakiness in a corresponding profile 452 of the same word of text that is not skewed (as illustrated in FIG. 4C).

Figure 4D:
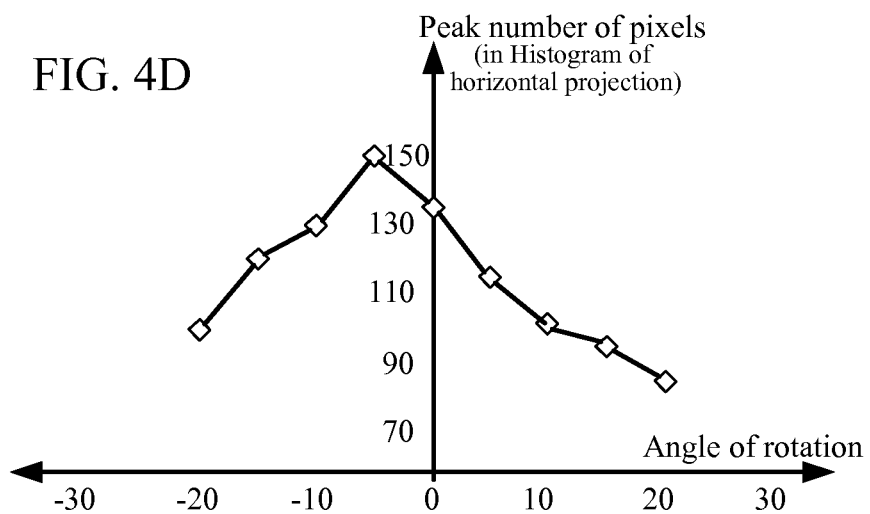
FIGS. 4D and 4E illustrate in two graphs shown for conceptual understanding, values of peaks along the y-axis and corresponding angles of rotation along the x-axis, for coarse (FIG. 4D) and fine (FIG. 4E) rotation.

Hence, some embodiments of the type described herein detect peakiness in a histogram of counters in act 403 as follows. Specifically, one or more processors 1000 identify any counter which has the largest value among the counters in the histogram, and store in memory 1012 that counter's value as a peak for a current angle (of orientation of region 421). Then, in an act 404, the one or more processors 1000 check whether the current angle has reached a predetermined limit of MAX_SKEW° and if not then processor(s) 1000 increment the current angle by a predetermined incremental value COARSE_RES° and then return to act 402 (described above) to repeat the process of finding a peak at the newly computed current angle. After a predetermined number of iterations, processor(s) 1000 complete identifying peaks at each increment in a range between −MAX_SKEW° and +MAX_SKEW° (e.g. between −30° and +30°) and on doing so go to act 406. In act 407, processor(s) 1000 find a highest peak among the multiple peaks stored in memory 1012 for region 421 (at each step in iterating between −MAX_SKEW° and +MAX_SKEW°), and store corresponding current angle (e.g. the angle −5° illustrated in FIG. 4D) as a Coarse Estimate for region 421. The resolution shown on the x-axis in FIG. 4D is 5° (which was used as the value of COARSE_RES).

Figure 4E:
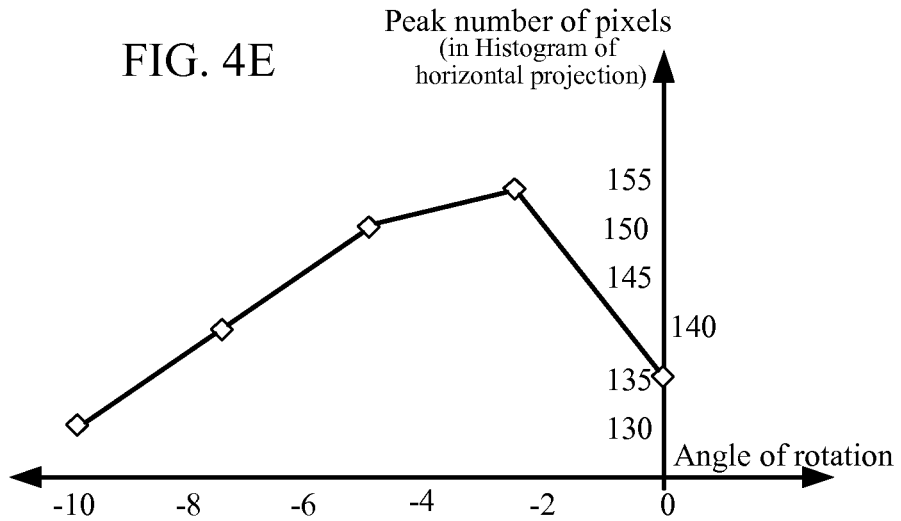

In summary, processor(s) 1000 prepare a histogram of counters of pixels in the region to identify a peak at a current angle, and repeating the preparing at multiple angles to identify a largest peak and a corresponding current angle, on completion of act 406. In some embodiments, projections are computed by processor(s) 1000 binning the y-coordinates of contour points at different angles, instead of rotating a binarized region (which is slower). Subsequently, another iteration is performed, this time incrementing at a smaller incremental value of FINE_RES° in a range around the Coarse Estimate, e.g. by starting with current angle=Coarse Estimate°−COARSE_RES° and iterating until the current angle reaches Coarse Estimate°+COARSE_RES° as illustrated by acts 408-411 which are similar to the above-described acts 402-405. On completion of this loop, control transfers from act 410 to act 412. In act 412, processor(s) 1000 identify a highest peak among stored peaks for the region, and store a corresponding current angle (e.g. at angle −2.5° as illustrated in FIG. 4E) as a candidate angle for skew of the region. The resolution shown on the x-axis in FIG. 4E is 2.5° (which was used as the value of FINE_RES).

As noted above, processor(s) 1000 then automatically check (as per act 222) whether at such a candidate angle, one or more attributes of projection profiles meet at least one test for presence of a straight line of pixels in the region, e.g. test for presence of pixel line 422 (FIG. 5A) as a portion of region 421 in box 420. Some embodiments evaluate peakiness of a profile of the histogram of region 421 at the candidate angle by comparing a highest value Np in the counters to a mean Nm of all values in the counters e.g. by forming a ratio therebetween as Np/Nm, followed by comparing that ratio against a predetermined limit thereon (e.g. ratio>1.75 indicates peak). When a peak is found (e.g. when the predetermined limit is exceeded by the ratio), then a y-coordinate of the peak (see Hp in FIG. 5A) is compared with a height of the box Hb to determine whether the peak occurs in an upper region of box 420. For example, if the ratio Hp/Hb is greater than 0.7 (or even 0.75, depending on the font), then the candidate angle is selected for the voting process and hence the yes branch is taken from act 222, followed by act 223 to increment a counter associated with the candidate angle.

Figure 5B:
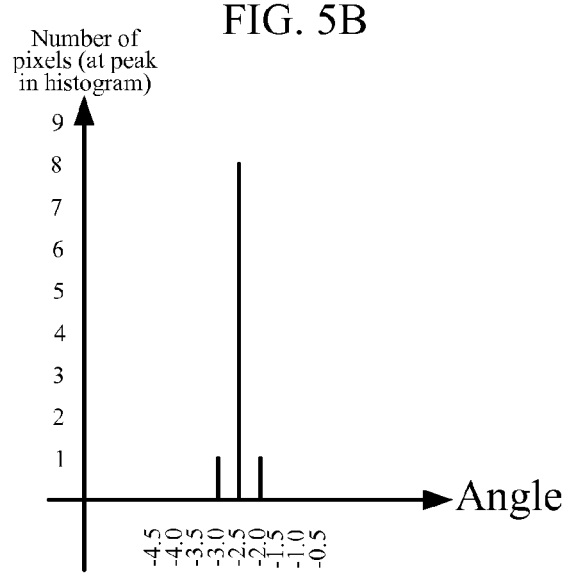
FIG. 5B illustrates, in a graph, identification of an angle of skew of the image, as the most common candidate angle, among a plurality of candidate angles of skew in the image, determined for multiple regions in the image.

After a sufficient number of such votes have been counted (e.g. 10 votes) then the counter with the largest number of votes is used to identify the skew angle chosen for the entire image (e.g. the counter for the skew angle of −2.5 as illustrated in FIG. 5B). Depending on the image and depending on the embodiment, there may be outliers (among the selected candidate angles) that are screened out by the above-described voting process. Specifically, binning and choosing whichever bin has the maximum vote as described above filters out any outliers.

Figure 7A:
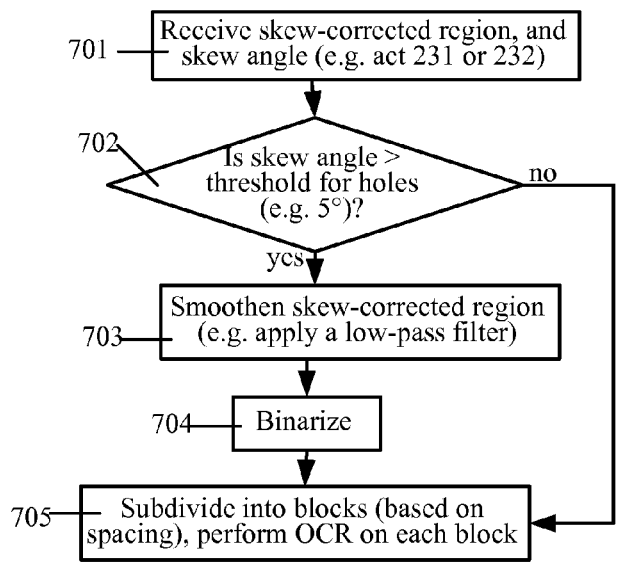
FIG. 7A illustrates, in a flow chart, acts performed subsequent to act 231 or 232 of FIG. 2, in some embodiments.
Figure 7B:
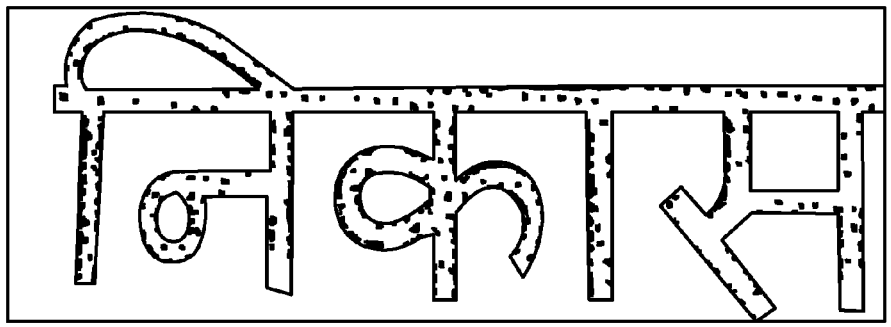
FIG. 7B illustrates regions of text after skew correction in some embodiments, as per act 231 resulting in holes in the regions.
Figure 7C:
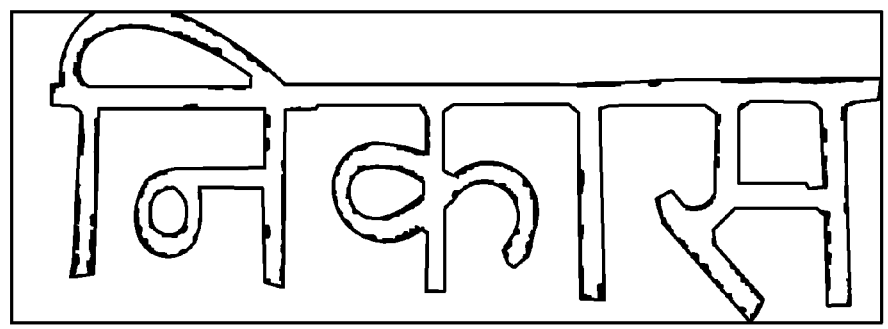
FIG. 7C illustrates the regions of FIG. 7B after performance of the method of FIG. 7A.

In some embodiments, after skew correction performed by act 231, depending on the magnitude of the skew angle, a skew-corrected region may contain a number of holes, due to rounding off errors in rotating the region. For example, FIG. 7B illustrates regions of text after skew correction in some embodiments, as per act 231 resulting in holes in the regions. Presence of such holes is mitigated in some embodiments, by performing the acts 701-705 illustrated in FIG. 7A, e.g. after performance of act 232 of FIG. 2, in some embodiments. Results of performance of acts 701-705 in the method of FIG. 7A are illustrated in FIG. 7C.

In several embodiments, in act 701, processor(s) 1000 receives from memory 1012, a skew-corrected region as well as the skew angle used in correcting the region (e.g. after performance of act 231 or 232). Next, in act 702, processor(s) 1000 checks whether the skew angle is greater than a predetermined threshold for presence of holes (e.g. 5°) and if not, processor(s) 1000 proceeds to act 705 wherein the region is subdivided into a number of blocks, and then performs OCR on each block to identify a corresponding character therein. When the skew angle is greater than the predetermined threshold, processor(s) 1000 proceeds to act 703 to smoothen the skew-corrected region (e.g. by applying a low-pass filter), followed by binarization in act 704 after which act 705 (described above) is performed.

In some embodiments of mobile device 200, a module to perform geometry-based selection of regions (also called text region selector), another module to perform line-presence based selection of candidate angles (also called candidate angle selector), and still another module to count the number of occurrences of a selected candidate angle (also called candidate vote counter) are included in OCR software that is implemented by a processor 1000 executing software in memory 1012 of mobile device 200, although in other embodiments any one or more of text region selector and skew angle selector are implemented in any combination of hardware circuitry and/or firmware and/or software in mobile device 200. Hence, depending on the embodiment, various functions of the type described herein of OCR software may be implemented in software (executed by one or more processors or processor cores) or in dedicated hardware circuitry or in firmware, or in any combination thereof.

Mobile device 200 of some embodiments that performs a method of the type shown in FIG. 2 is a mobile device, such as a smartphone that includes a camera 1011 (FIG. 6) of the type described above to generate an image (or a frame of video) of a real world scene that is then processed to identify any predetermined symbol therein. Mobile device 200 may further include sensors 1003 that provide information on movement of mobile device 200, such as an accelerometer, a gyroscope, a compass, or the like. Mobile device 200 may use an accelerometer and a compass and/or other sensors to sense tilting and/or turning in the normal manner, to assist at least one processor, such as processor 1000 in determining the orientation and position of a predetermined symbol in an image (or a frame of video) captured in mobile device 200.

Instead of or in addition to sensors 1003, mobile device 200 may use images from a camera 1011 to assist processor 1000 in determining the orientation and position of mobile device 200 relative to the predetermined symbol being imaged. Also, mobile device 200 may additionally include a graphics engine 1004 (FIG. 6) and an image processor 1005 that are used in the normal manner. Mobile device 200 may optionally include any one or more of: a text region selector, a candidate angle selector, and candidate vote counter (e.g. implemented by one or more processor(s) 1000 executing software in memory 1012) for use in automatically identifying an angle of skew in blocks received as input by OCR software (when executed by processor 1000).

In addition to memory 1012 (FIG. 6), mobile device 200 may include one or more other types of memory such as flash memory (or SD card) and/or a hard disk 1008 and/or an optical disk (also called "secondary memory") to store data and/or software for loading into memory 1012 (also called "main memory") and/or for use by processor(s) 1000. Mobile device 200 may further include a wireless transmitter and receiver in transceiver 1010 and/or any other communication interfaces 1009. It should be understood that mobile device 200 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform that is capable of creating an augmented reality (AR) environment.

A mobile device 200 of the type described above may include other position determination methods such as object recognition using "computer vision" techniques. The mobile device 200 may also include means for remotely controlling a real world object which may be a toy, in response to user input on mobile device 200 e.g. by use of transmitter in transceiver 1010, which may be an IR or RF transmitter or a wireless a transmitter enabled to transmit one or more signals over one or more types of wireless communication networks such as the Internet, WiFi, cellular wireless network or other network. The mobile device 200 may further include, in a user interface, a microphone and a speaker (not labeled). Of course, mobile device 200 may include other elements unrelated to the present disclosure, such as a read-only-memory or ROM 1007 which may be used to store firmware for use by processor 1000.

Also, depending on the embodiment, a mobile device 200 may perform text region selection, a candidate angle selection, and candidate vote counting locally within mobile device 200 (e.g. using hardware or by executing software in one or more processors or any combination thereof), to detect skew in images, in implementations that execute OCR software to identify, e.g. characters of text in an image. Hence, the above-described identification of a skew angle in an image (or a frame of video) for use by OCR software may be performed in software (executed by one or more processors or processor cores) or in hardware or in firmware, or in any combination thereof.

Although some embodiments of one or more processor(s) 200 perform text region selection, a candidate angle selection, and candidate vote counting using one or more inputs as described above, other embodiments use other inputs. Moreover, depending on the embodiment, any one or more a text region selector, a candidate angle selector, and candidate vote counter can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware in ROM 1007 (FIG. 6) or software in memory 1012, or hardware or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any non-transitory machine-readable medium tangibly embodying software instructions (also called "computer instructions") may be used in implementing the methodologies described herein. For example, software (FIG. 6) may include program codes stored in memory 1012 and executed by processor 1000. Memory may be implemented within or external to the processor 1000. If implemented in firmware and/or software, the functions may be stored as one or more instructions or code on a non-transitory computer-readable storage medium. Examples include non-transitory computer-readable storage media encoded with a data structure and non-transitory computer-readable media encoded with a computer program.

Non-transitory computer-readable storage media includes physical computer storage media. At least one non-transitory computer readable storage media may be any available non-transitory medium that can be accessed by a computer. By way of example, and not limitation, such non-transitory computer-readable media can comprise RAM, ROM, Flash Memory, EEPROM, CD-ROM or other optical disk storage, magnetic disk storage or other magnetic storage devices, or any other non-transitory medium that can be used to store program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable storage media.

Although the present invention is illustrated in connection with specific embodiments for instructional purposes, the present invention is not limited thereto. Hence, although mobile device 200 shown in FIG. 6 of some embodiments is a mobile device, in other embodiments the mobile device 200 can be any item or device is implemented by use of form factors that are different, e.g. in certain other embodiments the item is a mobile platform (such as a tablet, e.g. iPad available from Apple, Inc.) while in still other embodiments the item is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer communicating over one or more wireless link(s) with sensors and user input circuitry enclosed in a housing of mobile device 200 (FIG. 6) that is small enough to be held in a hand.

Depending on a specific symbol recognized in a handheld camera captured image, a user can receive different types of feedback depending on the embodiment. Additionally haptic feedback (e.g. by vibration of mobile device 200) is provided by triggering haptic feedback circuitry in some embodiments, to provide feedback to the user when text is recognized in an image. Instead of the just-described haptic feedback, audio feedback may be provided via a speaker in mobile device 200, in other embodiments.

Various adaptations and modifications may be made without departing from the scope of the described embodiments. It is to be understood that several other aspects of the described embodiments will become readily apparent to those skilled in the art from the description herein, wherein it is shown and described various aspects by way of illustration. Numerous modifications and adaptations of the embodiments and aspects described herein are encompassed by the attached claims.

The invention claimed is:

1. A method to correct skew in an image of a scene of real world, the method comprising:
   automatically selecting a subset of first regions by filtering out second regions, from among a set of regions identified in the image, at least based on one or more attributes related to geometry of the regions;
   automatically determining a plurality of candidate angles of skew, at least based on pixels in a particular region in the subset of first regions;

automatically identifying as an angle of skew of the image, a most common candidate angle among the plurality of candidate angles; and automatically rotating by negative of the angle of skew of the image, at least the subset of first regions;

wherein the automatically selecting, the automatically determining, the automatically identifying and the automatically rotating are performed by at least one processor.

2. The method of claim 1 wherein:

the one or more attributes related to the geometry of the regions includes one or more attributes selected from a group consisting of aspect ratio, height, and variance in width; and the automatically selecting comprises sorting the set of regions based on at least one of the one or more attributes related to the geometry of the regions.

3. The method of claim 1 wherein:

height is one of the one or more attributes related to the geometry of the regions; and the automatically selecting comprises comparing against a predetermined threshold H, the height of the particular region.

4. The method of claim 1 wherein:

variance in width is one of the one or more attributes related to the geometry of the regions; and the automatically selecting comprises comparing the variance in width of a portion of the particular region against a predetermined threshold V.

5. The method of claim 4 wherein:

the width used in comparing is a stroke width of the particular region.

6. The method of claim 1 wherein:

the automatically determining comprises preparing a histogram of counters of pixels in the particular region, to identify for the particular region a peak and repeating the preparing of a histogram at multiple angles relative to the particular region, to detect a largest peak and to identify the angle at which the largest peak is detected as a candidate angle.

7. The method of claim 1 wherein:

the automatically determining comprises checking whether at a candidate angle, one or more attributes of projection profiles meet at least one test for presence of a straight line of pixels in the particular region.

8. The method of claim 1 wherein:

the automatically selecting, the automatically determining, the automatically identifying and the automatically rotating are performed prior to classification of the subset of first regions as text or non-text.

9. At least one non-transitory computer readable storage media comprising a plurality of instructions to be executed by at least one processor to correct skew in an image of a scene of real world, the plurality of instructions comprising:

first instructions to select a subset of first regions by filtering out second regions, from among a set of regions identified in the image, at least based on one or more attributes related to geometry of the regions;

second instructions to determine a plurality of candidate angles of skew, at least based on pixels in a particular region in the subset of first regions;

third instructions to identify as an angle of skew of the image, a most common candidate angle among the plurality of candidate angles; and fourth instructions to rotate by negative of the angle of skew of the image, at least the subset of first regions.

10. The at least one non-transitory computer readable storage media of claim 9 wherein:

the one or more attributes related to the geometry of the regions includes one or more attributes selected from a group consisting of aspect ratio, height, and variance in stroke width; and the first instructions comprise instructions to sort the set of regions based on at least one of the one or more attributes related to the geometry of the regions.

11. The at least one non-transitory computer readable storage media of claim 9 wherein:

height is one of the one or more attributes related to the geometry of the regions; and the first instructions comprise instructions to compare against a predetermined threshold H, the height of the particular region.

12. The at least one non-transitory computer readable storage media of claim 9 wherein:

variance in width is one of the one or more attributes related to the geometry of the regions; and the first instructions comprise instructions to compare the variance in width of a portion of the particular region against a predetermined threshold V.

13. The at least one non-transitory computer readable storage media of claim 12 wherein:

the width used by the instructions to compare is a stroke width of the particular region.

14. The at least one non-transitory computer readable storage media of claim 9 wherein:

the second instructions comprise instructions to prepare a histogram of counters of pixels in the particular region, to identify for the particular region a peak and repeat execution of the instructions to prepare a histogram at multiple angles relative to the particular region, to detect a largest peak and to identify the angle at which the largest peak is detected as a candidate angle.

15. The at least one non-transitory computer readable storage media of claim 9 wherein:

the second instructions comprise instructions to check whether at a candidate angle, one or more attributes of projection profiles meet at least one test for presence of a straight line of pixels in the particular region.

16. The at least one non-transitory computer readable storage media of claim 9 wherein:

the first instructions, the second instructions, the third instructions, and the fourth instructions are configured to be executed prior to classification of the subset of first regions as text or non-text.

17. A mobile device to decode text in real world images, the mobile device comprising:

a camera;

a memory operatively connected to the camera to receive at least an image therefrom, the image comprising one or more text regions;

at least one processor operatively connected to the memory to execute a plurality of instructions stored in the memory;

wherein the plurality of instructions cause the at least one processor to:

select a subset of first regions by filtering out second regions, from among a set of regions identified in the image, at least based on one or more attributes related to geometry of the regions;

determine a plurality of candidate angles of skew, at least based on of pixels in a particular region in the subset of first regions;

identify as an angle of skew of the image, a most common candidate angle among the plurality of candidate angles; and rotate by negative of the angle of skew of the image, at least the subset of first regions.

18. The mobile device of claim 17 wherein the one or more attributes related to the geometry of the regions includes one or more attributes selected from a group consisting of aspect ratio, height, and variance in stroke width and wherein the at least one processor is further configured to:

sort the set of regions based on at least one of the one or more attributes related to the geometry of the regions.

19. The mobile device of claim 17 wherein the at least one processor is further configured to:

height is one of the one or more attributes related to the geometry of the regions; and compare against a predetermined threshold H, the height of the particular region.

20. The mobile device of claim 17 wherein the at least one processor is further configured to:

variance in width is one of the one or more attributes related to the geometry of the regions; and compare the variance in width of a portion of the particular region against a predetermined threshold V.

21. The mobile device of claim 20 wherein:

the width used by the at least one processor to compare is a stroke width of the particular region.

22. The mobile device of claim 17 wherein:

the plurality of instructions comprise instructions to prepare a histogram of counters of pixels in the particular region, to identify for the particular region a peak and repeat execution of the instructions to prepare a histogram at multiple angles relative to the particular region, to detect a largest peak and to identify the angle at which the largest peak is detected as a candidate angle.

23. The mobile device of claim 17 wherein:

the plurality of instructions comprise instructions to check whether at a candidate angle, one or more attributes of projection profiles meet at least one test for presence of a straight line of pixels in the particular region.

24. The mobile device of claim 17 wherein:

the plurality of instructions are configured to be executed prior to classification of the subset of first regions as text or non-text.

25. A mobile device comprising:

a camera to capture an image of an environment outside the mobile device;

a memory coupled to the camera for storing the image;

means, coupled to the memory, for identifying a set of regions in the image;

wherein each region in the set of regions is identified based on variation of intensities of pixels;

means for selecting a subset of first regions by filtering out second regions, from among the set of regions identified in the image, at least based on one or more attributes related to geometry of the regions;

means for determining a plurality of candidate angles of skew, at least based on pixels in the a particular region in the subset of first regions;

means for identifying as an angle of skew of the image, a most common candidate angle among the plurality of candidate angles, by use of at least one processor; and means for rotating by negative of the angle of skew of the image, at least the subset of first regions.

\* \* \* \* \*